(12) United States Patent
Hammer et al.

(10) Patent No.: US 6,656,547 B2
(45) Date of Patent: *Dec. 2, 2003

(54) CELLULOSE-BASED FOODSTUFF CASINGS PREPARED BY THE AMINE OXIDE PROCESS

(75) Inventors: Klaus-Dieter Hammer, Mainz (DE); Herbert Gord, Ingelheim (DE); Gerhard Grolig, Moerfelden-Walldorf (DE); Reinhard Maron, Rudolstadt (DE); Klaus Berghof, Rudolstadt (DE)

(73) Assignee: Kalle Nalo GmbH & Co. KG, Wiesbaden (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/142,034

(22) PCT Filed: Oct. 19, 1996

(86) PCT No.: PCT/EP96/04550

§ 371 (c)(1),
(2), (4) Date: Sep. 1, 1998

(87) PCT Pub. No.: WO97/31970

PCT Pub. Date: Sep. 4, 1997

(65) Prior Publication Data

US 2001/0023000 A1 Sep. 20, 2001

(30) Foreign Application Priority Data

Mar. 1, 1996 (DE) .......................................... 196 07 953

(51) Int. Cl.$^7$ ................................................ B29D 23/00
(52) U.S. Cl. .................... 428/34.8; 428/34.9; 428/35.7; 428/36.3; 428/36.9
(58) Field of Search .............................. 428/34.9, 35.7, 428/36.3, 36.9, 34.8

(56) References Cited

U.S. PATENT DOCUMENTS

| 5,462,980 A | * | 10/1995 | Bastioli et al. ................ 524/47 |
| 5,603,884 A | * | 2/1997 | DuCharme, Jr. et al. ... 264/703 |
| 6,033,618 A | * | 3/2000 | Gord et al. ................. 264/559 |

FOREIGN PATENT DOCUMENTS

| EP | 662283 A | * | 7/1995 |
| EP | 692194 A | * | 1/1996 |
| EP | 712889 A2 | * | 5/1996 |
| GB | 10002753 A | * | 8/1965 |
| WO | WO 93/13670 A | * | 7/1993 |
| WO | WO 95/07811 A | * | 3/1995 |
| WO | WO 95/35340 A | * | 12/1995 |

\* cited by examiner

Primary Examiner—Sandra M. Nolan
(74) Attorney, Agent, or Firm—Foley & Lardner

(57) ABSTRACT

The invention concerns flat or tubular cellulose-based foodstuff casings which are prepared by extruding ("spinning") cellulose dissolved in N-methyl-morpholine-N-oxide by means of a nozzle with an annular gap. After extrusion, the casings are stretched transversely in ambient air by blow moulding, and are then treated with an NMMO-containing aqueous spinning bath. The tubular casings are particularly suitable as sausage casings. Cut open, they can also be used as flat foils.

18 Claims, No Drawings

CELLULOSE-BASED FOODSTUFF CASINGS PREPARED BY THE AMINE OXIDE PROCESS

The invention relates to flat or tubular cellulose-based food casings which are produced by extruding ("spinning") cellulose dissolved in N-methylmorpholine N-oxide. The casings are particularly suitable as sausage casings.

Cellulose is insoluble in the usual solvents. It does not have a melting point or melting range and cannot therefore be melt-processed either. Therefore, it is usually chemically modified for producing food casings. However, these processes are associated with a breakdown of the cellulose, i.e. the mean degree of polymerization of the cellulose becomes lower. In addition, the processes are highly technically complex and correspondingly expensive.

Currently, the viscous process is preferred. In this process, the cellulose is reacted with sodium hydroxide solution and then with carbon disulfide. This produces a yellow-orange-colored cellulose xanthogenate solution which is extruded through a spinneret. The cellulose is then regenerated using precipitation and washing baths. A variety of apparatuses have had to be developed for this for cleaning up exhaust air and wastewater.

As early as 1936 it was discovered that cellulose is soluble in oxides of tertiary amines (DE 713 486); however, this discovery was not pursued further until 30 years later. In the course of this, N-methylmorpholine N-oxide (NMMO) was identified as the most suitable solvent. The cellulose dissolves therein without being chemically modified. No breakdown of the cellulose chains takes place. Preparation of the corresponding spinning solutions has also been disclosed (DD 218 104; DD 298 789; U.S. Pat. Nos. 4,145,532; 4,196,282; 4,255,300). Yarns may be produced from the solutions by extrusion into a spinning bath (DE-A 44 09 609; U.S. Pat. No. 5 417 909). WO 95/07811 (=CA 2 149 218) also discloses a process for producing tubular cellulose films by the amine oxide process. A characteristic of this process is cooling the extruded film by cooling gas immediately below the annular gap of the extrusion die. According to EP-A 662 283, the extruded tubular film is cooled internally using liquid.

Recovery and purification of the NMMOs are described in DD 274 435. Since the cellulose is not chemically modified in the process, less equipment is required. In the amine oxide process, no gaseous or aqueous waste products are produced, so that there are no problems with respect to the exhaust air or the wastewater. It is therefore achieving increasing importance.

EP-A 0 686 712 describes the production of flexible cellulose fibers by the N-methylmorpholine N-oxide (NMMO) spinning process. In this process, a cellulose solution in aqueous NMMO is forced through a spinneret, conducted via an air section into an NMMO-containing aqueous precipitation bath and then washed, post-treated and dried.

According to WO 93/13670, a seamless tubular food casing is produced by extruding a solution of cellulose in NMMO/water using a special extrusion die. An air section is situated between extrusion die and precipitation bath. A characteristic of this process is a specially shaped hollow mandrel through which the precipitation liquid can also circulate in the interior of the tube. In the air section, the interior of the extruded tube is virtually completely filled by a hollow mandrel and precipitation liquid. The film is not stretched transversely in the course of this.

WO 95/35340 describes a process for producing blown cellulose films in which an underivatized cellulose dissolved in NMMO is used.

However, the amine oxide process also has disadvantages. The underivatized cellulose molecules are already preorientated in the NMMO solution and are substantially more tightly packed than is the case with chemically modified ("derivatized") molecules. On extrusion, the orientation in the longitudinal direction is still more pronounced. The yarns thus produced therefore exhibit a high strength in the longitudinal direction, but only low strength in the transverse direction. They have a strong tendency to split on being mechanically stressed in the wet state. Films or other shaped bodies, which must be able to be loaded in the longitudinal and transverse direction, may thus scarcely be produced by this method.

The object was therefore to modify the amine oxide process in such a manner that sufficiently load-bearing films or shaped bodies, in particular tubular food casings, can be produced. The process should succeed in this case with as few steps as possible, and should remain inexpensive and environmentally compatible.

The object can be achieved if the wet treatment is combined with a blow molding. The present invention thus relates to a seamless tubular cellulose-based film, which is obtainable by extruding a cellulose-, N-methyl-morpholine N-oxide- and water-containing spinning solution through an annular die and treating the tubular film in an N-methylmorpholine N-oxide-containing aqueous spinning bath, wherein the spinning solution comprises 0.2 to 50% by weight, based on the weight of the cellulose, of modifying compounds which increase the suppleness, strength, clipping stability and shear stability of the tubular casing.

The spinning solution preferably comprises 7 to 15% by weight, particularly preferably 9 to 12% by weight, cellulose, in each case based on the total weight of the spinning solution. The mean degree of polymerization of the cellulose in this case is preferably 300 to 700, particularly preferably 400 to 650. As solvent, the spinning solution preferably comprises 90.5 to 92.5% by weight NMMO and 9.5 to 7.5% by weight water. The parameters mentioned in this paragraph, together with the temperature, essentially determine the viscosity and fluid behavior of the spinning solution.

Processes for preparing the spinning solution are generally familiar to those skilled in the art. Customarily, cellulose is mashed in a 60% strength by weight aqueous NMMO solution at room temperature. The cellulose usually originates from wood or cotton. As the temperature increases, water is then distilled off in a heated stirred tank under reduced pressure until the residue consists of cellulose and NMMO monohydrate. This is the case at an NMMO content of 87.7% by weight, based on the total weight of NMMO and water. The ratio of NMMO to water may be readily determined by the refractive index. In the NMMO monohydrate, the cellulose dissolved completely at a temperature of 85 to 95° C. with intensive stirring. The refractive index of the solution is 1.4910 to 1.4930. The water content has decreased to 7.5 to 9.5% by weight. The spinning solution is degassed, filtered and transferred to the spinning vessel.

The modifying compounds for improving the suppleness must be miscible with the cellulose/NMMO/water solution. The content of these compounds is preferably 0.5 to 20% by weight, particularly preferably 1 to 15% by weight, in each case based on the weight of the cellulose. The compounds may be mixed homogeneously with the spinning solution at a temperature of 85 to 105° C., preferably 90 to 100° C. Particularly suitable modifying compounds are starch, starch derivatives and cellulose derivatives (in particular esters or ethers of the starch or cellulose), as well as sugar esters, and in addition hydrophilic naturally occurring polymers (preferably alginic acid and alginates, chitosan and carrageenan). Suitable compounds are also hydrophilic synthetic polymers (preferably vinyl alcohol, vinyl acetates and acrylates) and polymers which simultaneously possess hydrophilic and hydrophobic properties (preferably esters from a sugar-such as sucrose-and fatty acids, the esters having an HLB of 1 to 15; HLB=hydrophilic-lipophilic balance). If appropriate, fatty acids and salts thereof, for example stearic acid or calcium stearate, waxes and paraffins are also suitable. Finally, polyvinylpyrrolidone, copolymers of vinylpyrrolidone and 2-(dimethylamino) ethylmethacrylate, copolymers of methyl vinyl ether and maleic anhydride or of methyl vinyl ether and maleic acid monoalkyl ester may also be used. The modifying compounds may also be crosslinkable, as is the case with polyethyleneimines. They also act as internal (primary) plasticizers. Impregnation with secondary plasticizers (such as glycerol) can frequently be even entirely omitted if the content of the modifying compounds in the food casings according to the invention is great enough (generally of the order of magnitude 8% by weight or more, based on the weight of the dry cellulose). Furthermore, they generally decrease the tendency of the cellulose to crystallize.

The spinning solution is extruded through the annular die preferably at a temperature of 85 to 105° C., particularly preferably 90 to 95° C. The annular gap is generally 0.1 to 2.0 mm wide, preferably 0.2 to 1.0 mm. The width here must be adapted to the warpage. "Warpage" is defined as the quotient of the velocity on leaving the annular gap (exit velocity) and the velocity at which the extruded tube is taken off (take-off velocity). The warpage is generally 3.0 to 0.10, preferably 2.0 to 0.2, particularly preferably 1 to 0.4. The exit velocity, depending on the construction of the plant, is 5 to 120 m/min, preferably 10 to 80 m/min. It is also determined by the caliber. On the extruded tube, advantageously, only a low tension is exerted in the longitudinal direction, which is essentially due to its own weight.

The "air section", i.e. the section between annular gap and surface of the spinning bath in which the blow molding takes place, is preferably 1 to 50 cm, particularly preferably 2.5 to 20 cm. It is also dependent on the diameter ("caliber") of the tubular film after the blow molding. In contrast to the abovementioned WO 95/07811 and EP-A 662 283, no measures are required for additional cooling in the air section, and accordingly they are also not provided. The extruded tube cools only a small amount in the air section. Otherwise, transverse stretching would scarcely be possible. The blow molding is effected by compressed air or other gases which pass into the interior of the tube through orifices in the die body. Stretching in the transverse direction considerably increases the transverse strength of the tube. Depending on warpage, the diameter of the blow-molded tube is up to 100% greater or up to 50% smaller, preferably up to 80% greater or up to 20% smaller, than immediately after exiting the annular gap. Transverse stretching with a diameter simultaneously becoming smaller is obviously only possible if the warpage is less than 1. Preferably, the diameter of the blow-molded tube is 10 to 100% greater, particularly preferably 20 to 80% greater than immediately after exiting the annular gap.

If appropriate, the tube is conducted via a pipe, preferably a metal pipe. The diameter of this pipe can be selected between 30% greater and 30% smaller than that of the annular gap. Precipitation liquid and support air are fed via this pipe.

After entering the spinning bath, the diameter of the tube decreases. Through appropriate apparatuses in the die body, the spinning bath solution also passes into the interior of the cellulose tube. As a result, the tube solidifies more rapidly; at the same time, the insides are prevented from sticking together. The liquid level in the interior of the tube should not be significantly higher or lower than that of the surrounding spinning bath. The spinning bath itself is an aqueous solution which comprises 5 to 50% by weight, preferably 8 to 20% by weight, of NMMO. The temperature of the spinning bath is in the range from 0 to 50° C., preferably 2 to 20° C.

The depth of the spinning bath is determined by the caliber of the cellulose tube, its wall thickness and the desired residence time in the bath. Generally, the depth should be selected so that, on flattening the tube on the guide roll, the resulting edges are not damaged. In the case of a tube of caliber 20, which, immediately after leaving the annular gap, has a wall thickness of 0.5 mm and passes through the bath at a velocity of 20 m per minute, the spinning bath has a depth of about 3 m.

For further solidification, the laid-flat tube then passes through still more NMMO-containing precipitation vats. The first precipitation vat comprises approximately 10 to 20% by weight of NMMO. In the following precipitation vat, the NMMO content decreases. It has been found to be favorable to increase the temperature from one precipitation vat to the next, up to about 60 to 70° C. in the last vat. The NMMO content in the tube is thus more greatly decreased.

This so-called "precipitation section" is followed by water-filled wash vats, in which the last traces of NMMO are removed from the tube. The temperature of these baths is 15 to 70° C., preferably 40 to 60° C. Generally, a so-called plasticizer vat then follows. This comprises an aqueous solution of a plasticizer for cellulose. Suitable plasticizers are polyols and polyglycols, in particular glycerol. The aqueous solution comprises 5 to 30% by weight, preferably 6 to 15% by weight, of plasticizer. The temperature of the plasticizer solution is advantageously 20 to 80° C., preferably 30 to 70° C. The glycerol content of the casing is then about 15 to 30% by weight, preferably 18 to 23% by weight, in each case based on its total weight.

Thereafter, the tubes are conducted through a hot-air dryer in the inflated state. Expediently, drying is performed at decreasing temperature (from about 150° C. at the inlet to about 80° C. at the outlet of the dryer). An additional transverse orientation may be achieved, if appropriate, by appropriately increased internal pressure on drying. Otherwise, the tube is inflated on drying to the original caliber, in order to retain the degree of transverse orientation once achieved. During drying, the swelling value decreases to 130 to 180%, preferably 140 to 170%, depending on drying conditions and glycerol content. The tube is then wetted until the water content is 8 to 20% by weight, preferably 16 to 18% by weight, in each case based on the total weight of the tube. Then, using a pinch-roll pair, it can be laid flat and wound up.

Used aqueous NMMO solution may be purified by ion-exchange columns. The water can be taken off under reduced pressure until the NMMO concentration has reached 60% by weight. This NMMO solution can then be used again for preparing the spinning solution. The NMMO is thus virtually completely recovered.

Depending on caliber, the finished tubes, at a glycerol content of 20 to 22% by weight and a water content of 8 to 10% by weight, in each case based on the total weight of the tube, have a weight of 30 to 120 g/m$^2$, preferably 35 and 80 g/m$^2$. The weight per unit area generally increases with increasing caliber. The bursting pressure is likewise dependent on the caliber (small calibers have a higher bursting pressure). For a tube having a caliber of 16 mm, the bursting pressure is about 60 kPa, for a caliber of 30 mm about 40 kPa, at a caliber of 50 mm about 24 kPa and at a caliber of 140 mm about 15 kPa. The bursting pressure is measured in each case here in the wet state.

The tubular casings according to the invention can, furthermore, be provided on the inside and/or outside with an impregnation or coating, e.g. a liquid smoke impregnation or an "easy peel" internal preparation. The same obviously applies to flat films.

An essential advantage of the flat or tubular films according to the invention is the uniform structure and thus uniform density which is achieved on precipitation. Films which are produced by the viscose process, in contrast, have a density gradient (higher density on the surface, lower in the interior).

The tubular films according to the invention are preferably used as sausage casings, in particular as "peelable casing" in the production of frankfurters. In addition, they can also be used as membranes for various purposes, e.g. in hemodialysis. Finally, flat films can also be produced by cutting open the tubes.

If the cellulose tubes are used as sausage casings, the stuffing caliber can correspond to the annular gap diameter or up to 120% above it. Preferably, the stuffing caliber is 10 to 80% above the annular gap diameter.

The following examples serve for more detailed description of the invention. Percentages therein are percentages by weight, unless stated otherwise. Flat width, weight of the casing and thickness of the casing wall were determined under standard conditions (55% relative humidity; 23° C.).

EXAMPLE 1

510 g of ground wood cellulose (®Cellunier F from Rayonier) having a mean degree of polymerization of 535 (determined by the Cuoxam method) was mashed in 5087 g of a 60% strength NMMO solution. The pH of the mash was then adjusted to 11 by NaOH. Under reduced pressure, with stirring and heating, water was then distilled off with increasing temperature, until, at an NMMO content of 87.7%, based on the total weight of water and NMMO, the monohydrate was present (recognizable by a refractive index of 1.4820). During this phase which lasted for approximately 4 hours, the vacuum was kept at 10 to 16 mmHg. After stirring for a further 2 to 3 hours, the cellulose was completely dissolved at about 85 to 95° C. In order that relatively little water is evaporated, the vacuum was set to about 200 mmHg during this time. The refractive index then ranged from about 1.4910 to 1.4930, which corresponds to a water content of 7.5 to 9%.

The spinning solution prepared in this manner was extruded at a temperature of 90° C. through an annular die at a gap diameter of 20 mm and a gap width of 0.5 mm. The tube first passed through an air section about 10 cm in length at a velocity of 20 m/min. In the course of this it was transversely stretched by air fed internally. It then passed through a spinning bath section of 3 m. The spinning bath comprised a 14% strength NMMO solution which was cooled to 5° C. A solution of the same composition was also introduced into the tube interior ("inner bath"). The tube was then laid flat at a guide roll in the spinning vat. The tube had been stretched transversely to the extent that its flat width after leaving the spinning vat was 30 mm. The edges showed no damage.

The tube then passed through 4 precipitation vats each having 8 guide rolls at the top and bottom, a bath depth of 1 m and an air section of 2 m. At the end of the last vat water was introduced which was conducted in counter-current. At the outlet of the first vat, the NMMO content was kept in this manner at 12 to 16%. The temperature increased up to 60 to 70° C. in the last vat. After passing through this precipitation section, residues of NMMO were washed out of the tube in 4 washing vats. The temperature in these vats was likewise 60 to 70° C. Finally, the tube was conducted through a plasticizer vat which comprised a 10% strength glycerol solution having a temperature of 60° C.

At a swelling value of 290%, the finished tube absorbed 21% glycerol. The flat width on leaving the glycerol vat was still 20 mm. The tube was then dried with hot air between 2 pinch-roll pairs. The dryer had a plurality of zones of decreasing temperature. The zone at the inlet had a temperature of 120° C., and that at the outlet 80° C.

Subsequently, the tube was wetted until its water content was 8 to 12% (based on the weight of cellulose) and was wound up. The bursting pressure of this tube was 52 kPa, its static extension was 20.5 mm, and its swelling value was 165%. It was then wetted to 16 to 18% and gathered in sections ("shirred to form shirred sticks").

The shirred sticks were stuffed with sausage emulsion on an automatic stuffing machine (®FrankAMatic), scalded and smoked. Thereafter, the casing was peeled by an automatic apparatus. In the scalding and smoking behavior, this peelable skin was at least as good as one produced by the viscose process.

EXAMPLE 2

A spinning solution as described in Example 1 was extruded at a temperature of 90° C. through an annular die 45 mm in diameter and a gap width of 0.7 mm. At a velocity of 20 m/min, the tube formed in this manner passed through an air section of 15 cm in order then to be immersed in the spinning bath. In the air section it was stretched transversely, as described above, with compressed air. The spinning bath had a depth of 3 m and was filled with a 12% strength aqueous NMMO solution which had a temperature of 5° C. Spinning bath solution was charged into the interior of the tube. On leaving the spinning vat, the tube had a flat width of 56 mm. Its swelling value was 302%. It was then inflated with reinforcing air, so that the flat width increased again to 66 mm. Before being wound up, it was wetted until the water content was 14 to 16%, based on the weight of the dry tube. The glycerol content was 20% at a total weight of 56 g/m$^2$. Swelling value was determined at 158%. The soaked tube had a bursting pressure of 30 kPa. Its static extension at an internal pressure of 15 kPa is 44 mm.

Sections of this tubular film each having a length of 50 m were shirred to form shirred sticks, which were then stuffed by an automatic stuffing machine using fine Mettwurst emulsion to a stuffing caliber of 44 mm. The sausages were then matured in the usual way and smoked. The casings according to the invention showed in this case properties at least as good as cellulose casings produced by the viscose process.

EXAMPLE 3

The spinning solution described in Example 1 was extruded at a temperature of 90° C. through an annular die having a die gap diameter of 26 mm and a die gap width of 0.6 mm. In contrast to the two preceding examples, the die body was joined to a 50 cm-long metal pipe over which the extruded tube was conducted. At the top end of the pipe there were situated orifices for feeding compressed air ("support air") required for the transverse stretching and the spinning bath solution. The air section between die gap and surface of the spinning bath was 2.5 cm. The spinning bath was filled with a 3° C., 14% strength aqueous NMMO solution. The spinning speed was 20 m/min. Sufficient support air was fed so that the tube had a flat width of 40 mm on leaving the spinning vat. Further treatment was then performed as described in Example 1. After leaving the plasticizer vat, the flat width was still 28 mm. The swelling value of the plasticized tube was 286%. It was then dried in the inflated state, wetted to 12 to 16% water content and wound up on a roll. The finished tube had a weight of 44 g/m$^2$. It comprised 22% glycerol (based on its total weight) and a swelling value of 165%. Its static extension at an internal pressure of 20 kPa was 25.8 mm, and its bursting pressure (measured in the wet state) was 42 kPa.

The tubes were shirred in sections to form shirred sticks and were stuffed with sausage emulsion to a stuffing caliber of 26 mm on an automatic stuffing machine. After scalding and smoking in the conventional manner, the casing was peeled off on an automatic plant and the sausages were then packed in cans. The sausage casings according to the invention complied with all requirements at least as well as the casings produced by the viscose process.

EXAMPLE 4

The spinning solution prepared in accordance with Example 1, which comprised about 9% cellulose, was homogeneously mixed, with stirring, with 3%, based on the weight of the cellulose, of a sucrose monostearic acid/ palmitic acid ester at a temperature of 95° C. It was then (at the same temperature) extruded through an annular die having a diameter of 20 mm and a gap width of 0.5 mm. At a velocity of 20 m/min, the tube first passed through a 10 cm long air section. In the course of this it was pressurized internally with compressed air and thus transversely stretched. Further production steps were identical to those described in Example 1.

The casings gathered in sections ("shirred sticks") were then placed onto the automatic stuffing machine and stuffed with sausage emulsion. After scalding and smoking, the casing was peeled off by an automatic apparatus. During scalding and smoking, the casing exhibited a behavior like the casings produced by the viscose process.

In the table below, the properties of a casing produced by the conventional viscose process termed "comparison") are compared with those of two casings according to the invention, the one (termed "A") comprising no modifying compounds and having been produced according to Example 1, whereas the other (termed "Be") comprising 3%, based on the weight of the cellulose, of the sugar ester mentioned in Example 4 and was produced in accordance with this example.

|  | Comparison | A | B |
|---|---|---|---|
| Flat width* (mm) | 29.2 | 26 | 28 |
| Weight* (g/m²) | 43.8 | 47.3 | 53.1 |
| Thickness* (μm) | 40 | 55 | 45 |
| Glycerol content** (%) | 20.5 | 20.7 | 20.5 |
| Swelling value (%) | 154 | 165 | 169 |
| Ultimate tensile strength***, longitudinal (N/mm²) | 1.5 | 22.6 | 21.5 |
| Elongation at break***, longitudinal (%) | 32 | 29.8 | 36.5 |
| Change in length after wetting (%) |  |  |  |
| longitudinal | −0.9 | −1.0 | +1.0 |
| transverse | −1.2 | −1.0 | −1.0 |
| after drying again (%) |  |  |  |
| longitudinal | −2.5 | −3.3 | −0.3 |
| transverse | −4.0 | −10.5 | −8.9 |
| Bursting pressure*** (kPa) | 48 | 52 | 50 |

*: measured under standard conditions
**: based on the total weight
***: in the wetted state

EXAMPLE 5

The spinning solution prepared in accordance with Example 1 was admixed with 5%, based on the weight of the cellulose, of a copolymer of methyl vinyl ether and maleic acid monobutyl ester (molar ratio 1:1) in the form of a 50% strength ethanolic solution and homogeneously mixed at a temperature of 95° C. The solution was then extruded through an annular die having a diameter of 40 mm and a gap width of 0.7 mm. The tube passed at a velocity of 20 m/min through an air section of 15 cm, within which it was transversely stretched by compressed air. The further manufacturing steps were identical to those described in Example 1.

On leaving the spinning bath, the tube had a flat width of 66 mm, which corresponds to a diameter of 42 mm. On leaving the glycerol vat, the flat width was 56 mm, and the swelling value 302%. The tube was then inflated with compressed air, so that the flat width increased again to 66 mm. Before being rolled up, it was wetted again until the water content was 14 to 16%. The glycerol content was 20%, based on the total weight of the casing, and the swelling value was 158%. The wetted tube had a bursting pressure of 30 kPa and a static extension of 44 mm at 15 kPa.

Sections each 50 m in length were shirred to form shirred sticks which were then mounted on an automatic stuffing machine. The casing was then mechanically stuffed with fine Mettwurst emulsion to a caliber of 44 mm, matured and smoked. The use properties corresponded to those of casings which had been produced by the viscose process.

The ultimate tensile strength (longitudinal) was 70%, the elongation at break 50%, above that of a casing likewise produced by the NMMO process, but without addition of the modifying compound. The shrinkage was 12% less than with the comparison material. The modified casing could be peeled off more readily from meat sausage than the non-modified casing.

EXAMPLE 6

The spinning solution prepared in accordance with Example 1 was admixed with 12%, based on the weight of the cellulose, of a copolymer of vinylpyrrolidone and 2-(dimethylamino)ethyl methacrylate (molar ratio 1:1) and homogeneously mixed at a temperature of 98° C. The solution was then extruded at this temperature through an annular die having a diameter of 26 mm and a gap width of 0.6 mm. At a velocity of 20 m/min, the tube passed through an air section of 50 mm, within which it was transversely stretched by compressed air, so that on leaving the spinning vat it had a flat width of 40 mm. The further manufacturing steps were identical to those described in Example 1. After leaving the plasticizer vat, the flat width was 36 mm, and the swelling value 286%.

The tube was then dried in the inflated state, wetted to 12 to 16% and rolled up. It comprised 22% glycerol and then had a swelling value of 165%. Its weight per square meter was 44 g. The bursting pressure (in the wet state) was determined as 50 kPa. The static extension at 20 kPa was 25.8 mm. The ultimate tensile strength in the wet state was 60%, and the elongation at break was 45%, over that of an unmodified comparison material.

The tubes were shirred in sections to form shirred sticks, which were stuffed with sausage emulsion on an automatic stuffing machine to a stuffing caliber of 26 mm, scalded and smoked. The casing was then peeled off by an automatic apparatus and the sausages were packaged in cans.

EXAMPLE 7

Example 6 was repeated with the difference that not 12% but 20% of the copolymer of vinylpyrrolidone and 2-(dimethylamino)ethyl methacrylate were mixed with the spinning solution. The solution was extruded through an annular die having a diameter of 40 mm and a gap width of 0.6 mm. At a velocity of 28 m/min, the tube passed through an air section of 12 cm in length, within which it was transversely stretched by compressed air. The further manufacturing steps were identical to those in Example 1.

On leaving the spinning vat, the tube had a flat width of 70 mm. In contrast to the other examples, the tube here did not pass through a softener vat, and therefore was free of glycerol. After drying it was wetted until the water content was 14 to 16% and then wound up. The swelling value was 142%, the bursting pressure 42 kPa and the static extension at 15 kPa was 44 mm. The shirred tube sections could be stuffed without problems on an automatic stuffing machine.

EXAMPLE 8

The spinning solution prepared in accordance with Example 1 was admixed with 0.8%, based on the weight of the cellulose, polyvinylpyrrolidone K 70 (mean $M_w$: 200,000) and stirred at a temperature of 95° C. until a homogeneous mixture had formed. The solution was then extruded through an annular die having a diameter of 80 cm and a gap width of 0.7 mm. At a velocity of 30 m/min, the tube passed through an air section 40 cm in length, within which it was transversely stretched by compressed air. The further manufacturing steps were identical to those described in Example 1, but the spinning bath comprised a 10% strength NMMO solution. The glycerol vat comprised a 7%. glycerol solution.

The tube was dried in the inflated state in such a manner that the flat width of 130 cm was not changed. After wetting to 14 to 16% water content, the tube was wound up. It was then cut on one edge. The flat film obtained in this manner had a weight of 40 g/m$^2$, a thickness of 35 µm, a glycerol content of 21%, a swelling value of 165%, an ultimate tensile strength of 20 N/mm$^2$ in the longitudinal direction and 16 N/mm$^2$ in the transverse direction, an elongation at break in the longitudinal direction of 42% and in the transverse direction of 54%.

What is claimed is:

1. A seamless tubular cellulose-based film obtained by extruding a spinning solution containing cellulose-, N-methylmorpholine N-oxide-, and water through an annular die and treating the tubular film in an N-methylmorpholine N-oxide-containing aqueous spinning bath, the film being transversely stretched by blow molding in an air section between the annular gap and surface of the spinning bath, wherein the spinning solution comprises 0.2 to 50% by weight, based on the weight of the cellulose, of one or more modifying compounds which increase the suppleness, strength, clipping stability and shear stability of the tubular casing and which are miscible with said spinning solution, wherein the modifying compound comprises a hydrophilic naturally occurring polymer, a hydrophilic synthetic polymer, a polymer which simultaneously possesses hydrophilic and hydrophobic properties, or a polyethyleneimine.

2. A film as claimed in claim 1, wherein the cellulose content in the spinning solution is 7 to 15% by weight, based on the total weight of the spinning solution.

3. A film as claimed in claim 1, wherein the cellulose has a mean degree of polymerization of 300 to 700.

4. A film as claimed in of claim 1, wherein the spinning solution comprises 90.5 to 92.5% by weight of NMMO and 9.5 to 7.5% by weight of water, based on the total weight of the solvent of the spinning solution.

5. A film as claimed in claim 1, wherein the spinning solution comprises 0.2 to 50% by weight of modifying compounds, based on the weight of the cellulose.

6. A film as claimed in claim 1, wherein the modifying compound comprises starch, a starch derivative or cellulose derivative, a sugar ester, alginic acid or an alginate, chitosan, carrageenan, vinyl alcohol, vinyl acetate, an acrylate, an ester of a sugar and fatty acids, the ester having an HLB value of 1 to 15, a fatty acid or salt thereof, wax, paraffin, polyvinylpyrrolidone, a copolymer of vinylpyrrolidone and 2-(dimethylamino)ethyl methacrylate, a copolymer of methyl vinyl ether and maleic anhydride, or a copolymer of methyl vinyl ether and maleic acid monoalkyl ester.

7. A film as claimed in of claim 1, wherein the spinning solution is extruded at a temperature of 85 to 105° C., through an annular die having a gap width of 0.1 to 2.0 mm.

8. A film as claimed in of claim 1, wherein the distance between the annular gap and a surface of the spinning bath is 1 to 50 cm.

9. A film as claimed in claim 1, wherein the spinning bath is an aqueous solution which comprises 5 to 50% by weight of NMMO and has a temperature of 0 to 50° C.

10. A film as claimed in claim 1, wherein the extruded tube, downstream of the spinning bath, further passes through a plurality of precipitation and washing baths.

11. A film as claimed in claim 1, which is treated with a plasticizer.

12. A sausage casing comprising a film as claimed in claim 1.

13. A flat film obtained by cutting open the tubular film of claim 1 in the longitudinal direction.

14. A film as claimed in claim 1, wherein the cellulose content in the spinning solution is about 9 to about 12% by weight, based on the total weight of the spinning solution.

15. A film as claimed in claim 1, wherein the cellulose has a mean degree of polymerization of 400 to 650.

16. A film as claimed in claim 5, wherein the spinning solution comprises about 1 to about 15% by weight of the modifying compounds, based on the weight of the cellulose.

17. A film as claimed in claim 1, wherein the spinning solution is extruded at a temperature of 90 to 95° C., through an annular die having a gap width of 0.2 to 1.0 mm.

18. A film as claimed in claim 1, wherein the distance between the annular gap and a surface of the spinning bath is from about 2.5 to about 20 cm.

* * * * *